(12) United States Patent
Muccini et al.

(10) Patent No.: US 9,811,140 B2
(45) Date of Patent: Nov. 7, 2017

(54) SYSTEMS AND METHODS FOR CONFIGURABLE POWER SUPPLY UNDER-VOLTAGE SETTING

(71) Applicant: Dell Products L.P., Round Rock, TX (US)

(72) Inventors: Mark A. Muccini, Georgetown, TX (US); John Erven Jenne, Austin, TX (US); Lei Wang, Austin, TX (US); Constantin Darius Livescu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 166 days.

(21) Appl. No.: 14/821,387

(22) Filed: Aug. 7, 2015

(65) Prior Publication Data

US 2017/0038812 A1   Feb. 9, 2017

(51) Int. Cl.
*G06F 1/00* (2006.01)
*G06F 1/30* (2006.01)
*G06F 1/28* (2006.01)

(52) U.S. Cl.
CPC . *G06F 1/30* (2013.01); *G06F 1/28* (2013.01)

(58) Field of Classification Search
CPC ..................................... G06F 1/30; G06F 1/28
USPC ................................................. 713/300, 340
See application file for complete search history.

(56) References Cited

U.S. PATENT DOCUMENTS

| | | | |
|---|---|---|---|
| 2003/0126474 A1* | 7/2003 | Sawyers | G06F 1/30 713/300 |
| 2008/0222439 A1* | 9/2008 | Lin | G06F 1/30 713/340 |
| 2010/0162024 A1* | 6/2010 | Kuris | G06F 11/3062 713/340 |
| 2011/0197018 A1* | 8/2011 | Noh | G06F 1/30 711/103 |
| 2016/0359359 A1* | 12/2016 | Hsu | H02M 1/32 |
| 2017/0031410 A1* | 2/2017 | Muccini | G06F 1/263 |
| 2017/0060210 A1* | 3/2017 | Ferguson | G11C 16/30 |

* cited by examiner

*Primary Examiner* — Aurel Prifti
(74) *Attorney, Agent, or Firm* — Jackson Walker L.L.P.

(57) ABSTRACT

In accordance with embodiments of the present disclosure, an information handling system may include a power supply unit having an input for receiving an alternating current input waveform and converting it into a direct current waveform on a bulk capacitor for storing charge and a controller configured to, based on at least one parameter of one or more information handling resources of the information handling system, determine a configurable under-voltage threshold defining a minimum direct current voltage delivered by the power supply when the alternating current input waveform is withdrawn.

21 Claims, 4 Drawing Sheets

SYSTEMS AND METHODS FOR CONFIGURABLE POWER SUPPLY UNDER-VOLTAGE SETTING

TECHNICAL FIELD

The present disclosure relates in general to information handling systems, and more particularly to systems and methods for providing a configurable power supply under-voltage setting in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to convert an alternating-current waveform received at an input to a bulk direct-current waveform, which is in turn converted at the output of the power supply unit to an output direct-current waveform used to power components of the information handling system. Thus, a power supply unit may include a rectifier and/or power factor correction stage configured to receive the input alternating current source and rectify the input alternating waveform to charge a bulk capacitor to a desired voltage. A direct-current-to-direct-current stage may convert the voltage on the bulk capacitor to a direct-current output voltage provided to components of the information handling system in order to power such components.

In traditional approaches, a power supply unit may be capable of, immediately after withdrawal of the alternating current input to the power supply unit, providing electrical energy at its output for a period of time (known as ride-through time and/or hold-up time) using charge stored on the bulk capacitor to provide an output direct-current voltage. Such period of time is limited, of course, as once the alternating current input is not available, the bulk capacitor will discharge.

During such period of time, the direct current output voltage may droop, yet still supply electrical energy to components at such reduced voltage. In traditional approaches, a fixed under-voltage threshold may define the minimum direct current voltage delivered by the power supply during ride-through/hold-up, such that once the direct current output voltage droops below such amount, the information handling system may disable the power supply from delivering a direct current output voltage.

SUMMARY

In accordance with the teachings of the present disclosure, the disadvantages and problems associated with existing approaches to providing adequate ride-through time and hold-up time in an information handling system may be reduced or eliminated.

In accordance with embodiments of the present disclosure, an information handling system may include a power supply unit having an input for receiving an alternating current input waveform and converting it into a direct current waveform on a bulk capacitor for storing charge and a controller configured to, based on at least one parameter of one or more information handling resources of the information handling system, determine a configurable under-voltage threshold defining a minimum direct current voltage delivered by the power supply when the alternating current input waveform is withdrawn.

In accordance with these and other embodiments of the present disclosure, a method may include determining a parameter associated with at least one or more information handling resources of an information handling system and, based on at least one parameter of one or more information handling resources of the information handling system, determining a configurable under-voltage threshold defining a minimum direct current voltage delivered by a power supply limit when an alternating current input waveform is withdrawn from an input of the power supply.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to determine a parameter associated with at least one parameter of one or more information handling resources of an information handling system and, based on at least one parameter of one or more information handling resources of the information handling system, determine a configurable under-voltage threshold defining a minimum direct current voltage delivered by a power supply unit when an alternating current input waveform is withdrawn from an input of the power supply.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
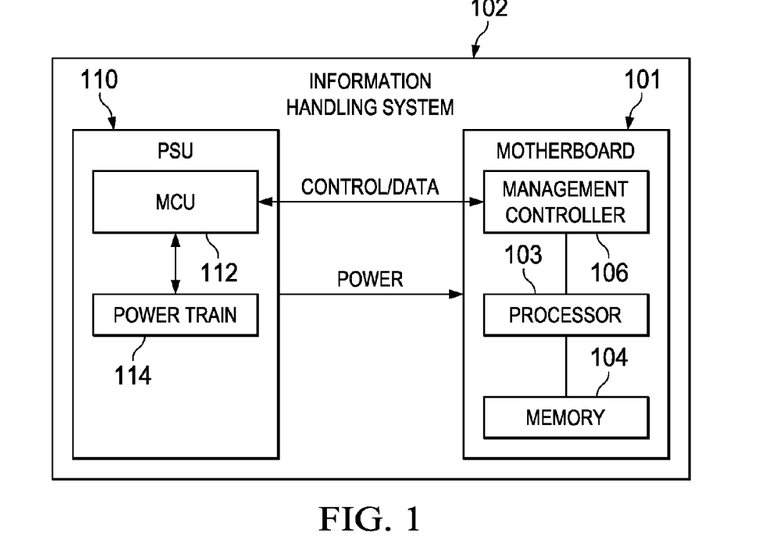
FIG. 1 illustrates a block diagram of an example information handling system, in accordance with embodiments of the present disclosure.

FIG. 1 illustrates a block diagram of an example of an information handling system 102. As depicted, information handling system 102 may include a power supply unit (PSU) 110, a motherboard 101, and one or more other information handling resources.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise a non-volatile memory comprising one or more NVDIMMs. Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110 (e.g., via a Power Management Bus). For example, PSUs 110 may communicate information regarding status and/or health of PSUs 110 and/or measurements of electrical parameters (e.g., electrical currents or voltages) present within PSU 110.

Generally speaking, PSU 110 may include any system, device, or apparatus configured to supply electrical current to one or more information handling resources of information handling system 102. As shown in FIG. 1, PSU 110 may include a microcontroller unit (MCU) 112 and a power train 114. Power train 114 of PSU 110 may be coupled at its outputs to a power bus configured to deliver electrical energy to motherboard 101 and other components of information handling system 102.

MCU 112 may comprise a microprocessor, DSP, ASIC, FPGA, EEPROM, or any combination thereof, or any other device, system, or apparatus for controlling operation of PSU 110. As such, MCU 112 may comprise firmware, logic, and/or data for controlling functionality of PSU 110. As shown in FIG. 1, an MCU 112 may be communicatively coupled to management controller 106 allowing for communication of data and/or control signals between management controller 106 and MCU 112.

Power train 114 may include any suitable system, device, or apparatus for converting electrical energy received by PSU 110 (e.g., a 120-volt alternating current voltage waveform) into electrical energy usable to information handling resources of information handling system 102 (e.g., 12-volt direct current voltage source). In some embodiments, power train 114 may comprise a rectifier. In these and other embodiments, power train 114 may comprise a voltage regulator (e.g., a multi-phase voltage regulator). An example implementation of power train 114 is set forth in FIG. 2 below.

In addition to motherboard 101, processor 103, memory 104, management controller 106, and PSU 110, information handling system 102 may include one or more other information handling resources. For example, in some embodiments, information handling system 102 may include more than one PSU 110.

Figure 2:
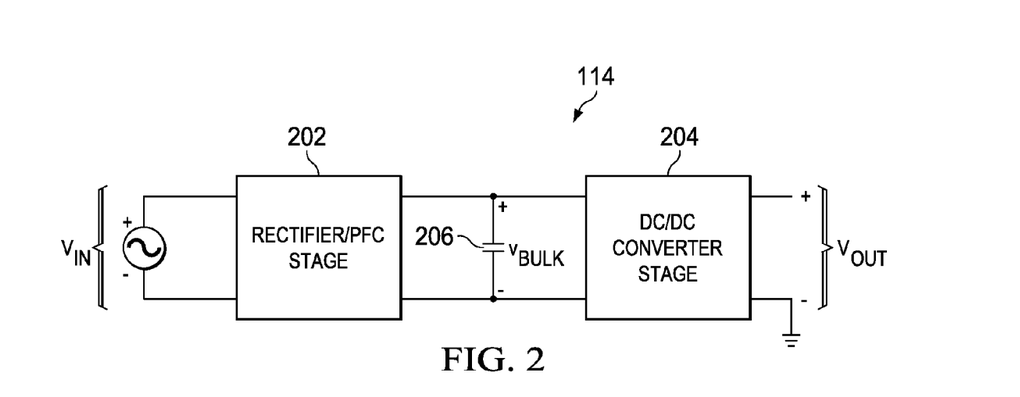
FIG. 2 illustrates an example power train of a power supply unit, in accordance with embodiments of the present disclosure.

FIG. 2 illustrates a block diagram of an example power train 114, in accordance with embodiments of the present disclosure. As shown in FIG. 2, power train 114 may include multiple converter stages: a rectifier/power factor correcting (PFC) stage 202, a DC/DC converter stage 204, and a bulk capacitor 206 coupled between an output of rectifier/PFC stage 202 and an input of DC/DC converter stage 204.

Rectifier/PFC stage 202 may be configured to, based on an input current $i_{IN}$, a sinusoidal voltage source $v_{IN}$, and a bulk capacitor voltage $V_{BULK}$, shape the input current $i_{IN}$ to have a sinusoidal waveform in-phase with the source voltage $v_{IN}$ and to generate regulated DC bus voltage $V_{BULK}$ on bulk capacitor 206. In some embodiments, rectifier/PFC stage 202 may be implemented as an AC/DC converter using a boost converter topology.

DC/DC converter stage 204 may convert bulk capacitor voltage $V_{BULK}$ to a DC output voltage $V_{OUT}$ which may be provided to a load (e.g., to motherboard 101 and/or other information handling resources of information handling system 102 in order to power such information handling resources). In some embodiments, DC/DC converter stage 204 may be implemented as a resonant converter which converts a higher DC voltage (e.g., 400 V) into a lower DC voltage (e.g., 12 V).

In operation, management controller 106 may on its own or in concert with MCU 112 or one or more other information handling resources of information handling system 102, set a configurable power supply voltage under-voltage threshold based on parameters and/or characteristics of PSU 110 and/or information handling resources of information handling system 102, as described in greater detail below.

Figure 3:
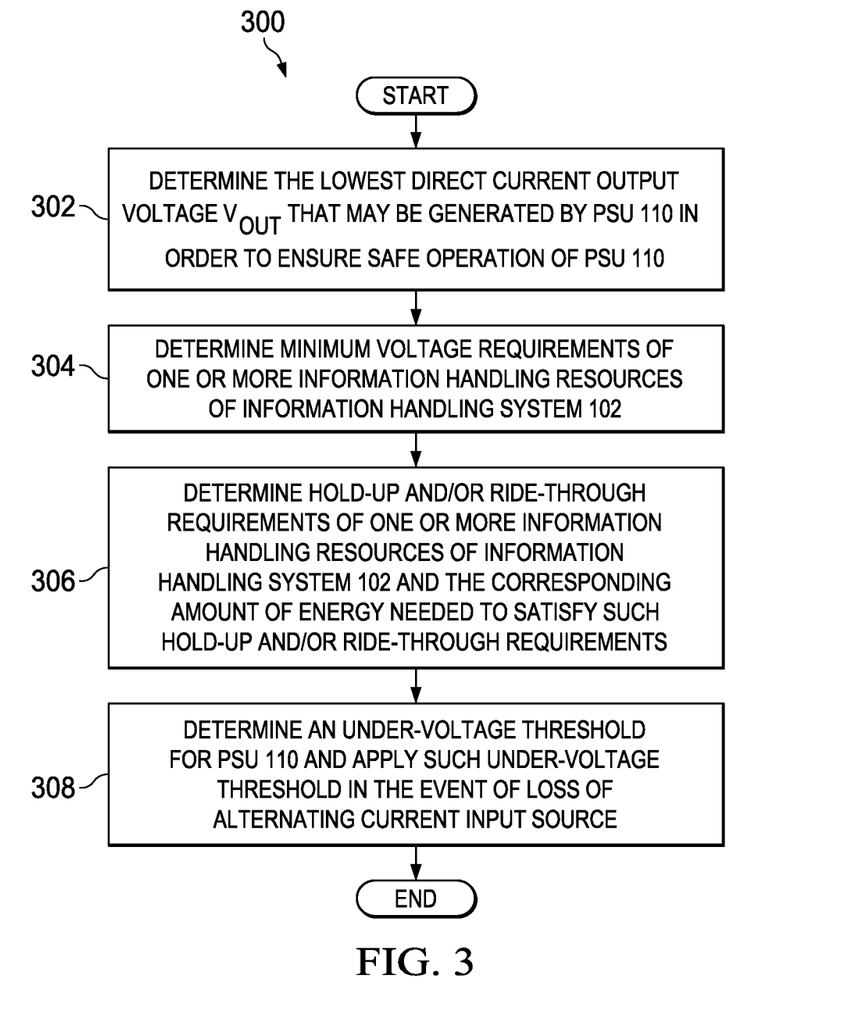
FIG. 3 illustrates a flow chart of an example method for setting a programmable under-voltage threshold, in accordance with embodiments of the present disclosure.

FIG. 3 illustrates a flow chart of an example method 300 for setting a programmable under-voltage threshold, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, management controller 106 may determine the lowest direct current output voltage $V_{OUT}$ that may be generated by PSU 110 in order to ensure safe operation of PSU 110. For example, as the direct current output voltage $V_{OUT}$ increases, one or more currents internal to PSU 110 (e.g., a current through an OR-ing MOSFET transistor) may increase. Components of PSU 110 through which such currents flow may have current limits. Thus, the lowest direct current output voltage $V_{OUT}$ that may be generated by PSU 110 may be a function of such current limits. In some embodiments, the lowest direct current output voltage $V_{OUT}$ that may be generated by PSU 110 may be based on other parameters of PSU 110.

At step 304, management controller 106 may determine minimum voltage requirements of one or more information handling resources of information handling system 102. Such minimum voltage requirements may represent, for each of one or more information handling resources or for each of one or more types of information handling resources, the minimum direct current voltage required by such an information handling system. For example, in some implementations, Peripheral Component Interconnect Express (PCIe) components may require a first minimum voltage (e.g., 10 V), voltage regulators may require a second minimum voltage (e.g., 8 V), and components of memory 104 (e.g., NVDIMMs) may require a third minimum voltage (e.g., 6 V) in order to perform cache flush operations.

At step 306, management controller 106 may determine hold-up and/or ride-through requirements of one or more information handling resources of information handling system 102 and the corresponding amount of energy needed to satisfy such hold-up and/or ride-through requirements.

At step 308, management controller 106 may, based on one or more of the lowest direct current output voltage $V_{OUT}$ that may be generated by PSU 110, the minimum voltage requirements of one or more information handling resources of information handling system 102, and hold-up and/or ride-through requirements of one or more information handling resources of information handling system 102, determine an under-voltage threshold for PSU 110 and apply such under-voltage threshold in the event of loss of alternating current input source. For example, from hold-up and/or ride-through requirements of one or more information handling resources of information handling system 102, management controller 106 may determine an under-voltage such that the energy needed to satisfy hold-up and/or ride-through requirements may be provided before the direct current output voltage $V_{OUT}$ droops to such under-voltage threshold. However, management controller 106 may place limits on such under-voltage threshold such that it also satisfies the minimum voltage requirements of one or more information handling resources of information handling system 102 and the lowest direct current output voltage $V_{OUT}$ that may be generated by PSU 110 in order to ensure safe operation of PSU 110.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

Although the systems and methods described above contemplate setting of a single configurable under-voltage threshold, in some embodiments, management controller 106 may be able to generate and apply multiple under-voltage thresholds based on system need. For example, as noted above, different information handling resources of information handling system 102 may have minimum voltage requirements. Thus, a first under-voltage threshold (e.g., 10 V) may be applied to a first information handling resource or type of information handling resource (e.g., PCIe devices), a second under-voltage threshold (e.g., 8 V) may be applied to a second information handling resource or type of information handling resource (e.g., voltage regulators), and so on. After loss of alternating current input source, the direct current output voltage $V_{OUT}$ may provide energy to information handling resources of information handling system 102 and when the first under-voltage threshold is reached, such information handling resources requiring the first under-voltage may power down, and the direct current output voltage $V_{OUT}$ may continue to power information handling resources requiring a lower voltage amount until their respective under-voltage thresholds are met.

Among the advantages of the methods and system described herein are that a configurable under-voltage setting may have the effect of increasing available hold time. For example, in existing approaches, a fixed under-voltage threshold may be set at a particular value for output voltage $V_{OUT}$, which may occur when bulk voltage $V_{BULK}$ decreases to a particular value $V_{BULK\_UV\_FIXED}$ (e.g., 250 V). However, using the approaches described herein, a configurable under-voltage threshold may be set to a lower output voltage $V_{OUT}$, which may occur when bulk voltage $V_{BULK}$ decreases to a particular value $V_{BULK\_UV\_CONFIG}$ (e.g., 200 V) which is less than $V_{BULK\_UV\_FIXED}$. Thus, the additional energy available for ride-through/hold-up may be given by $$E = C(V_{BULK\_UV\_FIXED}^2 - V_{BULK\_UV\_CONFIG}^2)/2$$

Where C is the capacitance of bulk capacitor 206. As a specific example, for a capacitance C of 680 μF, $V_{BULK\_UV\_FIXED}$ of 250 V and a $V_{BULK\_UV\_CONFIG}$ of 200 V, an additional 7.65 joules of energy may be available as compared to the traditional fixed under-voltage threshold approach. For a system load of 300 W, such additional energy translates into an additional ride-through/hold-up time of 25.5 milliseconds.

Figure 4:
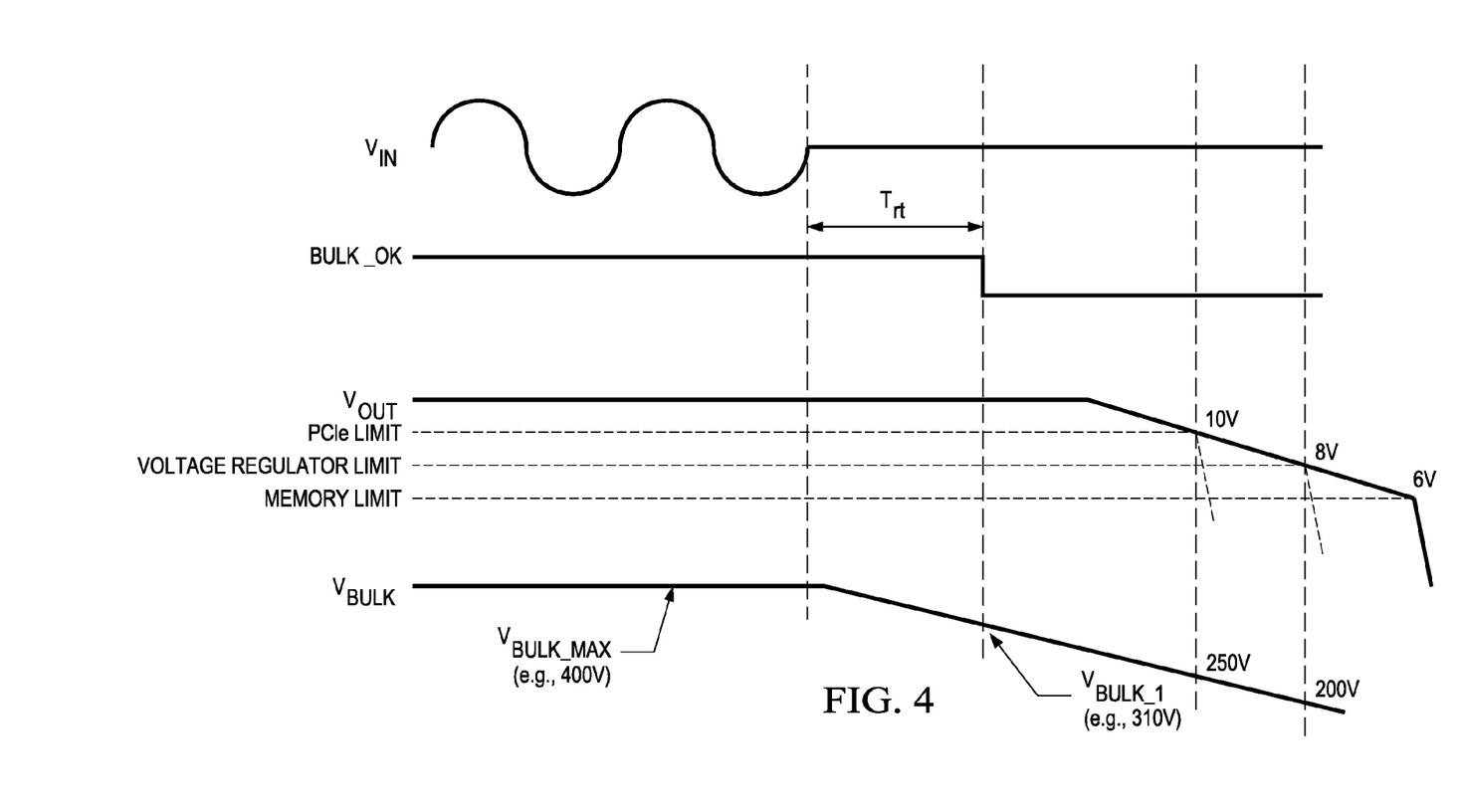
FIG. 4 illustrates an example timing diagram of various voltages associated with a power supply unit as a function of time in response to a loss of an input power source to a power supply unit, in accordance with embodiments of the present disclosure.

FIG. 4 illustrates an example timing diagram of various voltages associated with a power supply unit as a function of time in response to a loss of an input power source to a power supply unit, in accordance with embodiments of the present disclosure. As shown in FIG. 4, input alternating current source voltage $v_{IN}$ may be withdrawn at a time $t_1$. Immediately after loss of the input alternating current source voltage $v_{IN}$, power supply unit 110 may enter a ride-through period $T_{rt}$ at the end of which a signal BULK_OK may be de-asserted, signifying the end of the ride-through period and beginning of a hold-up period at time $t_2$.

After loss of the input alternating current source voltage $v_{IN}$, bulk voltage $v_{BULK}$ on bulk capacitor 206 may begin to decay from a fully-charged value of $v_{BULK\_max}$ (e.g., 400 V). At the end of the ride-through period at time $t_2$, bulk voltage $v_{BULK}$ may have decayed to a first value $v_{BULK\_1}$ (e.g., 310 V). At some point after beginning of the hold-up period at time $t_2$, direct current output voltage $v_{OUT}$ may begin decaying from its maximum value $v_{OUT\_max}$ (e.g., 12V) in accordance with a turns ratio of DC-to-DC converter 204. In many existing approaches, bulk voltage $v_{BULK}$ would decay to a fixed undervoltage (e.g., 250 V), after which PSU 110 would be configured to cease generating a direct current output voltage $v_{OUT}$.

However, in accordance with systems and methods disclosed herein, power supply unit 110 may have one or more programmable undervoltages for extending hold-up time. For instance, in the specific example in FIG. 4, may have a programmable undervoltage voltage of 200 V and/or lower, such that power supply unit 110 may continue supplying a direct current output voltage $v_{OUT}$. Thus, although a particular bulk voltage $V_{BULK}$ may not support a direct current output voltage $v_{OUT}$ sufficient to power certain components, the lower programmable undervoltage may allow components with lower direct current power supply requirements to continue to operate. As an example, in the specific example shown in FIG. 4, a lower programmable undervoltage of 200 V may support a direct current output voltage $v_{OUT}$ (e.g., 8V) sufficient for a voltage regulator or memory even though it may not support a direct current output voltage sufficient for PCIe devices. Accordingly, with such a programmable undervoltage, components which may no longer be capable of operating with lower direct current output voltages $v_{OUT}$ may cease operating while others capable of operating at lower voltage may continue operation to enable graceful shutdown of information handling system 102. As an further example, in the specific example shown in FIG. 4, in addition or in lieu of the programmable undervoltage of 200 V, an even lower programmable undervoltage may support an even lower direct current output voltage $v_{OUT}$ (e.g., 6V) sufficient for a memory even though it may not support a direct current output voltage sufficient for PCIe devices or a voltage regulator.

Figure 5:
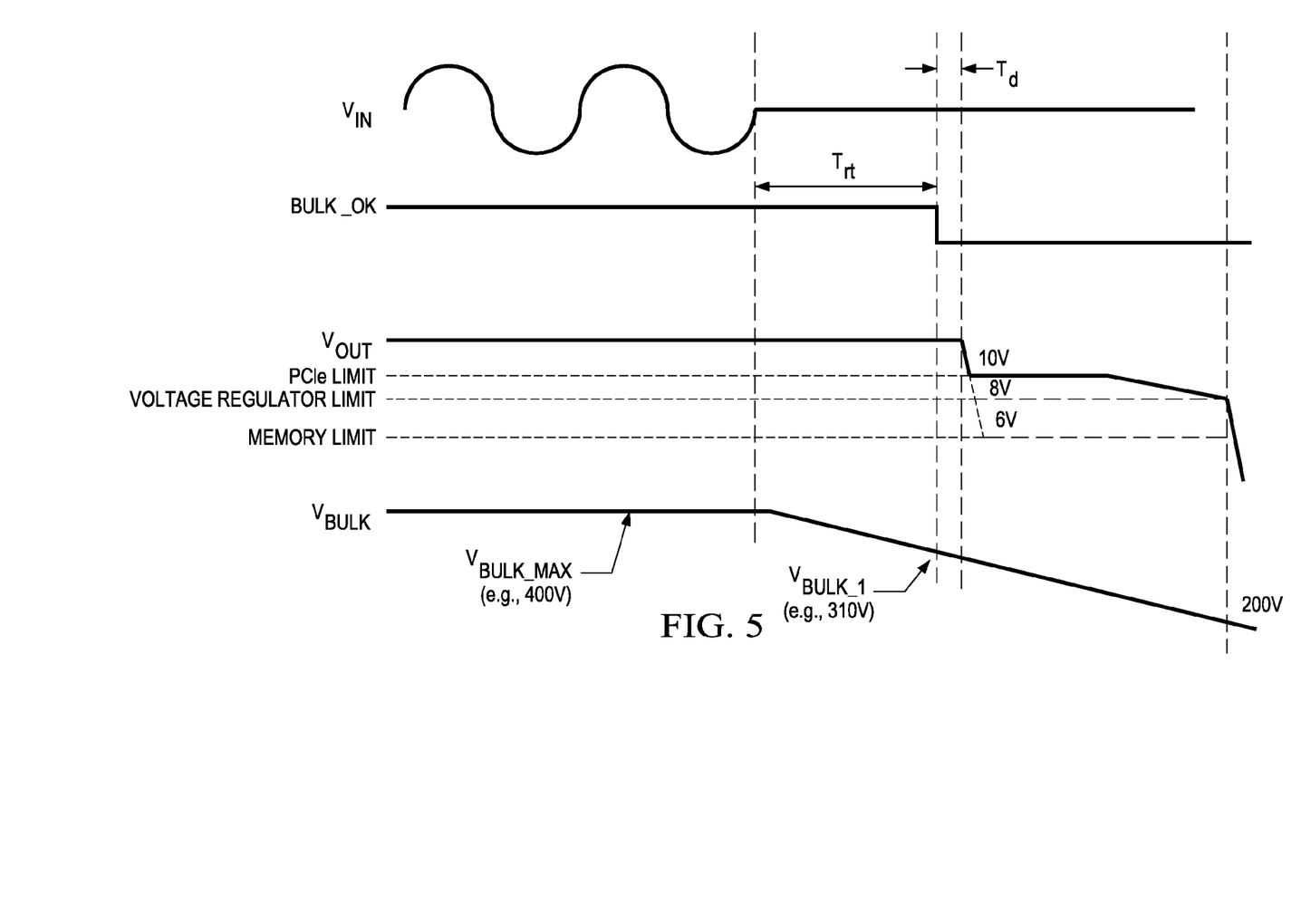
FIG. 5 illustrates another example timing diagram of various voltages associated with a power supply unit as a function of time in response to a loss of an input power source to a power supply unit, in accordance with embodiments of the present disclosure.

FIG. 5 illustrates another example timing diagram of various voltages associated with a power supply unit as a function of time in response to a loss of an input power source to a power supply unit, in accordance with embodiments of the present disclosure. The timing diagram in FIG. 5 is similar to that of FIG. 4, and thus only the key differences between FIG. 5 and FIG. 4 will be described. In FIG. 5, rather than the direct current output voltage $V_{OUT}$ decaying as bulk voltage $V_{BULK}$ decays in accordance with the turns ratio of DC-to-DC converter 204, PSU 110 or another component of information handling system 102 may instead decrease and regulate the programmable direct current output voltage $V_{out}$ to remain constant at the programmable direct current undervoltage for as long as bulk voltage $V_{BULK}$ supports such programmable direct current undervoltage. Thus, in the example shown in FIG. 5, after a programmable output voltage delay time $T_d$ occurring immediately after expiration of the ride-through time $T_{rt}$, $V_{out}$ may decrease to the programmable direct current output undervoltage (e.g., 10V in FIG. 5), and remain at such level until bulk voltage $V_{BULK}$ no longer supports such programmable direct current output undervoltage, after which direct current output voltage $V_{out}$ may decay in proportion to decay of bulk voltage $V_{BULK}$. Such programmable output voltage delay time $T_d$ may be an amount of time necessary to ready components of information handling system 102 for the lower undervoltage setting.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a power supply unit having an input for receiving an alternating current input waveform and converting the alternating current input waveform into a direct current waveform on a bulk capacitor for storing charge; and
   a controller configured to, based on at least one parameter of one or more information handling resources of the information handling system, determine a configurable under-voltage threshold defining a minimum direct current voltage to be delivered by the power supply when the alternating current input waveform is withdrawn;
   wherein the at least one parameter comprises a minimum voltage requirement of a particular information handling resource of the information handling system that is operable to allow a cache in a volatile memory to be flushed to a non-volatile memory when the alternating current input waveform is withdrawn.

2. The information handling system of claim 1, wherein the at least one parameter further comprises a parameter associated with the power supply unit.

3. The information handling system of claim 2, wherein the parameter associated with the power supply unit comprises a lowest direct current output voltage that may be generated by the power supply unit.

4. The information handling system of claim 1, wherein the at least one parameter further comprises a plurality of minimum voltage requirements of a plurality of information handling resources of the information handling system and wherein the controller is configured to determine a plurality of under-voltage thresholds based on each of the plurality of minimum voltage requirements.

5. The information handling system of claim 1, wherein the at least one parameter further comprises at least one of hold-up requirements and ride-through requirements of one or more information handling resources of the information handling system.

6. The information handling system of claim 5, wherein the under-voltage threshold is determined based on an amount of energy needed to satisfy the at least one of hold-up requirements and ride-through requirements.

7. The information handling system of claim 1, wherein the power supply unit is configured to regulate the direct current waveform constantly at under-voltage threshold for a period of time.

8. A method comprising:
   determining at least one parameter associated with one or more information handling resources of an information handling system; and
   based on the at least one parameter, determining a configurable under-voltage threshold defining a minimum direct current voltage delivered by a power supply when an alternating current input waveform is withdrawn from an input of the power supply;
   wherein the at least one parameter comprises a minimum voltage requirement of a particular information handling resource of the information handling system that is operable to allow a cache in a volatile memory to be flushed to a non-volatile memory when the alternating current input waveform is withdrawn.

9. The method of claim 8, wherein the at least one parameter further comprises a parameter associated with the power supply unit.

10. The method of claim 9, wherein the parameter associated with the power supply unit comprises a lowest direct current output voltage $V_{OUT}$ that may be generated by the power supply unit.

11. The method of claim 8, wherein the at least one parameter further comprises a plurality of minimum voltage requirements of a plurality of information handling resources of the information handling system and the controller is configured to determine a plurality of under-voltage thresholds based on each of the plurality of minimum voltage requirements.

12. The method of claim 8, wherein the at least one parameter further comprises at least one of hold-up requirements and ride-through requirements of one or more information handling resources of the information handling system.

13. The method of claim 12, wherein the under-voltage threshold is determined based on an amount of energy needed to satisfy the at least one of hold-up requirements and ride-through requirements.

14. The method of claim 8, further comprising regulating the direct current waveform constantly at under-voltage threshold for a period of time.

15. An article of manufacture comprising:
   a non-transitory computer-readable medium; and
   computer-executable instructions carried on the computer-readable medium, the instructions readable by a processor, the instructions, when read and executed, for causing the processor to:
   determine at least one parameter of one or more information handling resources of an information handling system; and
   based on the at least one parameter, determine a configurable under-voltage threshold defining a minimum direct current voltage delivered by a power supply unit when an alternating current input waveform is withdrawn from an input of the power supply;

wherein the at least one parameter comprises a minimum voltage requirement of a particular information handling resource of the information handling system that is operable to allow a cache in a volatile memory to be flushed to a non-volatile memory when the alternating current input waveform is withdrawn.

16. The article of claim 15, wherein the at least one parameter further comprises a parameter associated with the power supply unit.

17. The article of claim 16, wherein the parameter associated with the power supply unit comprises a lowest direct current output voltage $V_{OUT}$ that may be generated by the power supply unit.

18. The article of claim 15, wherein the at least one parameter further comprises a plurality of minimum voltage requirements of a plurality of information handling resources of the information handling system and the controller is configured to determine a plurality of under-voltage thresholds based on each of the plurality of minimum voltage requirements.

19. The article of claim 15, wherein the at least one parameter further comprises at least one of hold-up requirements and ride-through requirements of one or more information handling resources of the information handling system.

20. The article of claim 19, wherein the under-voltage threshold is determined based on an amount of energy needed to satisfy the at least one of hold-up requirements and ride-through requirements.

21. The article of claim 15, the program of instructions for further causing the processor to regulate the direct current waveform constantly at under-voltage threshold for a period of time.

* * * * *

UNITED STATES PATENT AND TRADEMARK OFFICE
CERTIFICATE OF CORRECTION

PATENT NO. : 9,811,140 B2
APPLICATION NO. : 14/821387
DATED : November 7, 2017
INVENTOR(S) : Mark A. Muccini et al.

It is certified that error appears in the above-identified patent and that said Letters Patent is hereby corrected as shown below:

In the Claims

Please amend the formatting of Claim 7 as follows:
7. The information handling system of Claim 1, wherein the power supply unit is configured to regulate the direct current waveform constantly at the under-voltage threshold for a period of time.

Please amend the formatting of Claim 14 as follows:
14. The method of Claim 8, further comprising regulating the direct current waveform constantly at the under-voltage threshold for a period of time.

Please amend the formatting of Claim 21 as follows:
21. The article of Claim 15, the program of instructions for further causing the processor to regulate the direct current waveform constantly at the under-voltage threshold for a period of time.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*